US005333640A

United States Patent [19]

Swift et al.

[11] Patent Number: 5,333,640
[45] Date of Patent: Aug. 2, 1994

[54] FLOW DIVIDER TO RECEIVE, SPLIT, AND DISTRIBUTE A SUBSTANCE, CONSISTING OF MULTIPLE SMALL UNITS, BEING MOVED VIA FLOW GAS UNDER PRESSURE INTO RESPECTIVE PASSAGEWAYS

[76] Inventors: Steven M. Swift, 17822 Driftwood Dr., Sumner, Wash. 98390; Jon C. Houghton, 16205 Auburn Black Diamond Rd., Auburn, Wash. 98002

[21] Appl. No.: 67,728

[22] Filed: May 24, 1993

[51] Int. Cl.$^5$ .................................................. F16N 7/30

[52] U.S. Cl. ................................ 137/262; 137/561 A; 184/55.2

[58] Field of Search ............... 137/262, 561 R, 561 A; 184/55.1, 55.2

[56] References Cited

U.S. PATENT DOCUMENTS

| | | | |
|---|---|---|---|
| 1,208,373 | 12/1916 | Rhodes | 137/262 |
| 2,584,960 | 2/1952 | Beardsell et al. | 137/262 |
| 3,747,622 | 7/1973 | Reinhall | 137/262 |
| 4,621,507 | 11/1986 | Lundqvist | 137/561 A |
| 5,101,847 | 4/1992 | Oribe | 137/561 A |

*Primary Examiner*—John Rivell
*Attorney, Agent, or Firm*—Roy E. Mattern, Jr.

[57] ABSTRACT

A flow divider, i.e. a splitter, to receive flow through an input port, is arranged in respective embodiments, with each embodiment respectively dividing flows, with each flow comprising a combined flow of a substance, consisting of multiple small units, and a gas flow under pressure, with the energy of the gas flow moving all the multiple small units of the substance throughout the flow divider for delivery therefrom through outlet ports thereof. In one embodiment, a housing has an input portion and an output portion, with the input portion having a central input port extending from the exterior into the interior thereof, and an interior recess to receive a seal, and with the output portion having a centered cavity to receive a centered shaft and a disc rotor on the shaft, and outlet ports extending from the centered cavity to the exterior of the housing. After installing the seal, shaft, and disc rotor, the housing portions are secured together. The driving power of the disc rotor is derived from the energy of the flow of the gas under pressure, by providing turbine blades on the disc rotor. Also in this one embodiment, the disc rotor has an active surface structure to receive the combined flow of the substance and the gas flow, which rises in approaching the periphery to collect the substance to improve upon the uniformity of the departure of the substance from the rotating disc rotor and into equal flows through the outlet passageways and ports thereof.

28 Claims, 3 Drawing Sheets

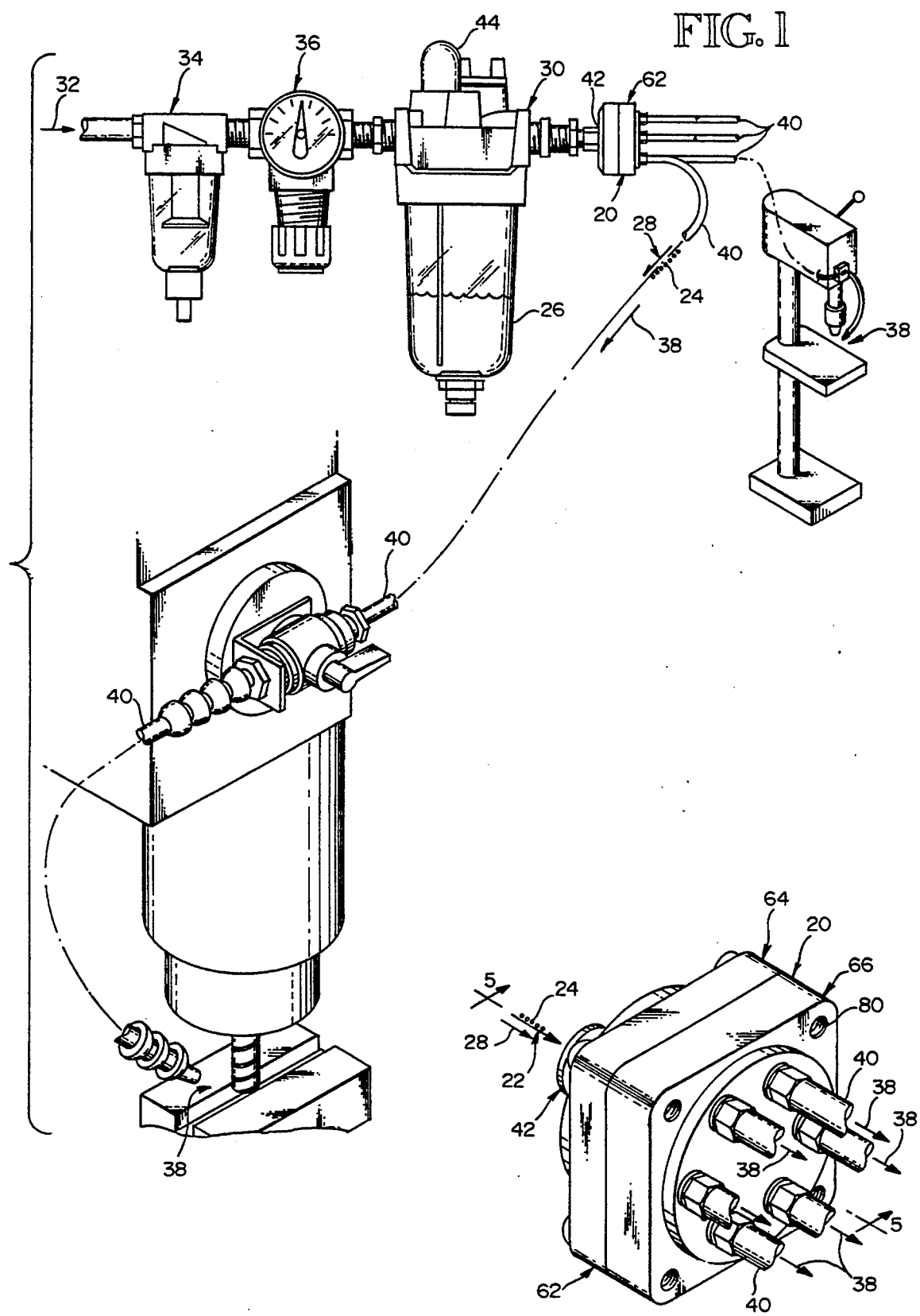

FLOW DIVIDER TO RECEIVE, SPLIT, AND DISTRIBUTE A SUBSTANCE, CONSISTING OF MULTIPLE SMALL UNITS, BEING MOVED VIA FLOW GAS UNDER PRESSURE INTO RESPECTIVE PASSAGEWAYS

BACKGROUND

In reference to U.S. Pat. No. 5,086,878 of Feb. 11, 1992, Steven M. Swift illustrated and described his tool and workplace lubrication system having a modified air line lubricator to create and to start the delivery of a uniformly flowing pressurized air flow with oil, to deliver the oil continuously and uniformly, where a metal part is being formed. In FIG. 7 of this patent he illustrated how the pressurized air flow with the oil was divided into two equal flows to deliver the oil to opposite sides of a circular saw.

Subsequently, Steven M. Swift wanted to divide this pressurized air flow with oil into several equal flows to deliver the oil to several places of use. In reviewing inventions of others, the following features were noted.

In some U.S. patents, one liquid or one gas was received from one source and then distributed in portions, often equal portions, to several locales of utilization. In respect to this group of patents:

In 1932, in U.S. Pat. No. 1,885,500, Larkin R. Williamson illustrated and described his lubricating system for a power press, wherein a reservoir above was kept filled, upon operation of a pump, with sufficient lubricant to distribute lubricant, by gravity flow, to many distributing lines connected to the bottom of the reservoir and directed respectively to many places on the power press, which were being lubricated;

In 1944, in U.S. Pat. No. 2,351,620, Edward H. Kocker, disclosed the utilization of some of the hydraulic oil, primarily used in operating a machine tool, to also lubricate operating portions of the machine tool, via several restricted flow outlets, arranged in parallel, of a lubricating system;

In 1949, in U.S. Pat. No. 2,467,722, David B. Baker illustrated and described his oil distributing apparatus used on cotton harvesting machines. The lubricating oil was directed, via drops on a tube, to a receptacle pocket, filling this pocket to its brim or to a weir means. The lubricating oil then flowed over the brim or weir into multiple passageways leading to respective lubricating places on the harvesting machine;

In 1952, in U.S. Pat. No. 2,593,115, James C. Danly, disclosed his continuous oiling system for power presses in which the lubricant is pumped from a return oil reservoir or manifold into conduits for delivery to vat ious locations throughout the power press;

In 1958, in U.S. Pat. No. 2,832,368, John G. Freer illustrated and described his fluid distribution device to distribute either gas or liquid into a plurality of individual streams, each having a flow rate bearing a predetermined relation to the flow rates of the other streams, all of them being either a gas or a liquid stream; and In 1985, in U.S. Pat. No. 4,549,567, Donelson B. Horton disclosed his fluid distributor to evenly divide the flow from a single fluid line to and between a plurality of fluid lines. One of the fluids distributed was a fertilizer containing a large proportion of particles, more or less in suspension. His fluid distributor had a rotor, having a distributing passageway portion, positioned above pie-shaped exit compartments in a tubular housing. The distributing passageway of the rotor extended from a central top opening in the overall tubular housing, downwardly, with a circumferential cant, to just above the compartmented exits. The fluid passing through the distributing passageway created a force producing the rotation of the rotor. As the rotor turned, the discharging fluid sequentially fed the compartments and passed through exits of these respective compartments.

In some other U.S. patents, one liquid and one gas were received from respective sources or from one source and then distributed in portions, often equal portions, to several locales of utilization. In respect to this group of patents:

In 1924, in U.S. Pat. No. 1,504,341, Charles C. Hansen illustrated and described his air line oiler connected to an air line, under pressure, for conveying lubricant within this air line to lubricate portions of fluid actuated machines such as rock drills, grinders, and rotary drills. Mr. Hansen provided a casing to receive the air under pressure, and to direct this air through three exits, after the air had first passed by three respective cartridges composed of wire gauze and absorbent material, such as felt, which were filled with the absorbed lubricant. Passageways extended from the three exits to three lubrication locales on a machine, to distribute the flowing air carrying the lubricant;

In 1930, in U.S. Pat. No. 1,766,663, Edward E. McClure disclosed his lubricating mechanism for edger saws. Air under pressure was directed through a tank of lubricant, and then carrying lubricant with it, the air under pressure flowed through an atomizing and regulating device, while being supplemented with more air under pressure. The air carrying the atomized lubricant then passed through a branching conduit, and on through various passageways leading to lubricating locales on the edger saws;

In 1982, in U.S. Pat. No. 4,353,435, Messrs. Abrams and Baumann illustrated and described their wide flow range lubricant distributor. Their distributor received a single stream of a pressurized air-oil stream, and then divided this air-oil stream into other like streams, which were essentially in uniform quantities. Their distributor projected the incoming single stream, as a spray, across a gap, and then the spray impinged the respective inlets of lubrication tubes positioned to face the spray, to collect the respective air-oil stream, and then to direct the respective air-oil stream to a lubricating locale;

Also in 1982, in U.S. Pat. No. 4,359,141, Horst Schell disclosed his lubricating system, which received lubricant in the form of droplets in an air-oil mixed air flow and divided this air-oil flow into at least two separate outlet streams. During the transition from one incoming stream or passageway into at least two departing streams in passageways, the air-oil flow was directed through symmetrically spaced groups of conduits, thereby dividing the air-oil flow into a plurality of intermediate currents or air-flows. Then each group of conduits respectively converged to one or the other of the two departing streams in passageways, each one leading to a respective lubricating locale. Mr. Schell's lubricating system remained free of oil mist and operated essentially independently of gravity regardless of the spacial orientation thereof; and In 1991, in U.S. Pat. No. 5,002,156, Frank L. Gaunt illustrated and described his positive displacement pneumatic lubricator to deliver lubricant and atomizing air to a lubricating locale involving a tool and a workpiece. A precision, positive, displacement, pneumatic injection pump in turn operates a lubricant pump, so with each pulse of the pneumatic pump, a unit or pulse of lubricant is discharged into a lubricant passageway leading to a lubrication locale. The lubricant passageway is coaxially arranged in the interior of an atomizing air passageway, and the respective flows of lubricant and atomizing air are independently regulated.

The merit of these inventions concerned with dividing flows of one fluid, and flows of combined air flows and lubricants, are recognized. However, there remains a need for more conveniently dividing flows of one fluid, and especially flows of combined air flows and substances, consisting of multiple small units.

SUMMARY

To more conveniently divide a flow of one fluid, and especially a flow of a combined gas and a substance, consisting of multiple small units, a flow divider, also referred to as a splitter, is arranged to be placed in any spacial orientation to receive a flow under pressure entering through an input thereof. In each of several embodiments, the flow divider is capable of receiving a combined flow of a substance, consisting of multiple small units, and a gas flow under pressure, with the energy of the gas flow moving all the multiple small units of the substance throughout the flow divider for delivery therefrom through outlet ports thereof. Inside the flow divider, a centered input passageway directs the incoming combined flow to the center of a rotating disc rotor. Thereafter, by centrifugal force the combined flow is distributed throughout an active surface structure of the rotating disc rotor. After departing from the disc rotor, the combined flow, in essentially equal proportions, passes into respective multiple output passageways, for delivery, via respective passageways, to selected locales, where the multiple small units of the substance are wanted to serve a designated purpose.

The disc rotor, in reference to various spacial orientations, preferably has the active surface structure thereof formed so this surface rises in approaching the periphery of the disc rotor. Any substance, consisting of multiple small units, tends to collect at and near the periphery of the disc rotor and this collection improves upon the uniformity of the departure of the substance from the rotating disc rotor, and into the equal flows through the outlet passageways and ports thereof.

The energy needed to rotate the disc rotor is optionally supplied by motors, optionally powered by electricity, hydraulic systems, and pneumatic systems. Also, if the gas flow is strong enough, some of the energy of the gas flow, is utilized, in conjunction with spaced fluid turbine blades integrally formed with the disc rotor, to rotate the disc rotor, independently of any requirement to have a separate motor. In addition, to provide a range of greater operations and control thereof, the utilization of both a motor and spaced fluid turbine blades, is provided in a flow divider.

This flow divider is used when the combined flow is:

- droplets of lubricant being moved by flowing air under pressure;
- droplets of water being moved by flowing air under pressure;
- small units of graphite moved by flowing argon under pressure;
- small units of fertilizers being moved by flowing air under pressure;
- small units of fertilizers being moved by flowing water under pressure;

DESCRIPTION OF THE DRAWINGS

Embodiments of flow dividers to receive, split, and distribute a substance, consisting of multiple small units, being moved via flowing gas under pressure into respective passageways, or to receive, split, and distribute just a fluid, is illustrated in the drawings, wherein:

FIG. 1 is a combined side and perspective view of how the flow divider is used, when the substance, consisting of multiple small units, is lubricant consisting of droplets, which are being moved via air, as the gas, under pressure, when the combined flows of air under pressure and the droplets of lubricant, coming, for example, from modified air line lubricator, are received, split and distributed in an embodiment of the flow divider, also referred to as a splitter, and delivered to respective locales of lubrication, where a tool and workpiece are located;

FIG. 2 is a perspective view of the flow divider shown in FIG. 1, as viewed from the output ports thereof;

FIG. 3 is an exploded view in perspective of the flow divider, shown in FIGS. 1 and 2, to especially show the disc rotor, which in this embodiment has fluid turbine blades, which capture some of the energy of the flowing air under pressure, to create forces rotating the disc rotor, to centrifugally force the movement of the combined flow of droplets of lubricant and air under pressure across the active surface structure of this disc rotor;

FIG. 4 is a view to show the positioning of the disc rotor in the housing of the flow divider in respect to the location of the output passageways;

FIG. 5 is a view, partially in section, to illustrate the assembled positions of all of the components of the flow divider;

FIG. 6 is an enlarged view of the disc rotor to show the fluid turbine blades, and the active surface structure of the disc rotor, which receives the incoming flow, and which rises in approaching the periphery thereof, and which in this view appears as a rim;

FIG. 7 is an enlarged view of some portions of the flow divider, shown in section, and especially illustrating how the active surface structure of the disc rotor appears, which in this view appears as a rim;

FIG. 8 is a figure somewhat like FIG. 1, but showing fewer components, to illustrate how the flow splitter has a power input shaft leaving at right angles, which is driven by a motor to rotate the disc rotor;

FIG. 9 is a figure somewhat like FIG. 8, but showing the supply passageway leaving, for example, a modified air line lubricator, changing direction to enter a flow divider located below, and also showing an in line power input shaft, which is driven by a motor to rotate the disc rotor, and indicating how the output passageways are positioned to be clear of this shaft and the motor;

FIG. 10 is an enlarged view of a disc rotor with fluid turbine blades, and with an active surface structure of this disc rotor, which does not rise in approaching the periphery thereof;

FIG. 11 is an enlarged view of a disc rotor, without fluid turbine blades, but with an active surface structure of this disc rotor, which does rise in approaching the periphery thereof; and FIG. 12 is an enlarged view of a disc rotor, without fluid turbine blades, and with an active surface structure of this disc rotor, which does not rise in approaching the periphery thereof.

DESCRIPTION OF PREFERRED EMBODIMENTS

Figure 3:
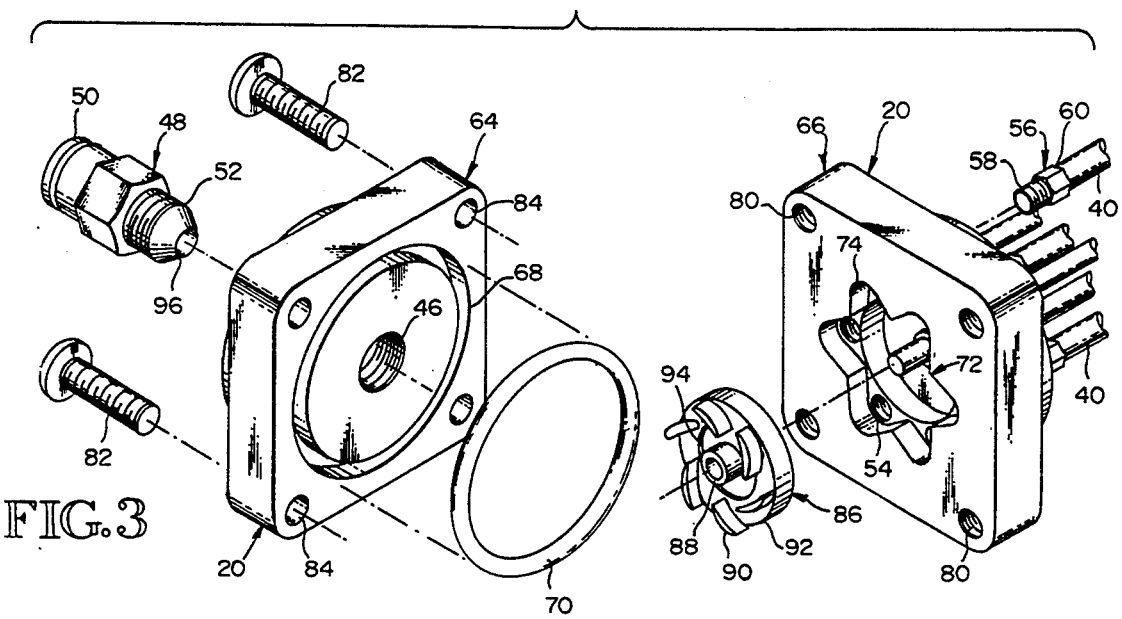

Introduction to the Flow Divider, Also Referred to as the Splitter

The flow divider, illustrated in various embodiments, in the drawings, by way of examples, will receive a flow of a single fluid and divide this flow into substantially equal flows. However, this flow divider is particularly useful in respective selected embodiments of its several embodiments, to receive, split, and distribute a substance, consisting of multiple small units, being moved via flowing gas under pressure into respective passageways. This flow divider, is used when the combined flow is:

droplets of lubricant being moved by flowing air under pressure;

droplets of water being moved by flowing air under pressure;

small units of graphite moved by flowing argon under pressure;

small units of fertilizers being moved by flowing air under pressure;

small units of fertilizers being moved by flowing water under pressure;

An Embodiment of the Flow Divider Particularly Useful, When the Combined Flow is Droplets of Lubricant, Being Moved by Flowing Air Under Pressure In the drawings, throughout FIGS. 1 through 9, the embodiments shown of the flow divider 20, are used when the combined incoming flow 22 is droplets 24 of lubricant 26 being moved by flowing air 28 under pressure.

As illustrated in FIG. 1, the combined flow of droplets of lubricant being moved by flowing air under pressure may be coming from a modified air line lubricator 30, which is also illustrated in FIG. 1 of U.S. Pat. No. 5,086,878 and designated as the principal portion 38 of that disclosed tool and workpiece lubrication system. Also the combined flow of droplets of lubricant being moved by the flowing air under pressure may be coming from other equipment.

As shown in FIG. 1, a pressurized air flow 32, from a source not shown, passes through both an airflow filter 34, and an airflow regulator 36, before reaching the modified air line lubricator 30. As described in U.S. Pat. No. 5,086,878, the modified air line lubricator 30 creates a combined flow 22 of droplets 24 of lubricant 26, and air 28 under pressure.

This combined flow 22 becomes the incoming combined flow 22 also referred to as the input flow 22, entering the flow divider 20 to be received, split, and distributed in substantially equal like combined flows 38, designated as leaving combined flows 38, and also referred to as output flows 38. These combined flows 22 and 38 are moved by the selected pressure air flow at pressures, which are low enough to avoid turbulence, yet high enough to gently move along the droplets 24 of the lubricant 26, within the small inside diameter passageways in a continuous combined flow 22 or 38.

With respect to this embodiment illustrated in FIGS. 1 through 9, the internal diameters of the passageways 40 are preferably one eighth of an inch in diameter. Three sixteenths of an inch in diameter passageways 42 are also used. The pressurized air flow 32 is preferably pressurized in a range of ten to twenty pounds per square inch. The maximum pressure is forty five pounds per square inch. A preferred flow rate of the lubricating oil 26, i.e. lubricant 26, as viewed in the sight dome 44 of the modified air line lubricator 30, is often three drops per minute. Noting that fifteen hundred drops of lubricant generally comprise one ounce of lubricating oil 26, or lubricant 26, than at a rate of use of three drops per minute, an ounce of lubricating oil 26, will last during a continuous operation period of over eight hours, i.e. 8.33 hours.

As particularly shown in FIG. 2, the illustrated embodiment of the flow divider 20, receives an incoming or input combined flow 22, of droplets 24 of lubricant 26, and air 28 under pressure, preferably through a passageway 42, having three sixteenths of an inch in interior diameter. After this incoming combined flow 22 is received, split, and distributed, it leaves in six substantially equal leaving or output combined flows 38.

This flow divider 20, as indicated in FIGS. 1, 2, 3, and 5 is equipped with fittings which aid in the installation thereof in lubricating systems. The input passageway 46 is threaded to receive a first combination 48 of a threaded attachment unit 50 and a disbursement unit 52. Each output passageway 54 is threaded to receive one of the six alike second combinations 56 of a threaded attachment unit 58 and a disbursement unit 60. In other installations of a flow divider these fittings may not be used.

Figure 4:
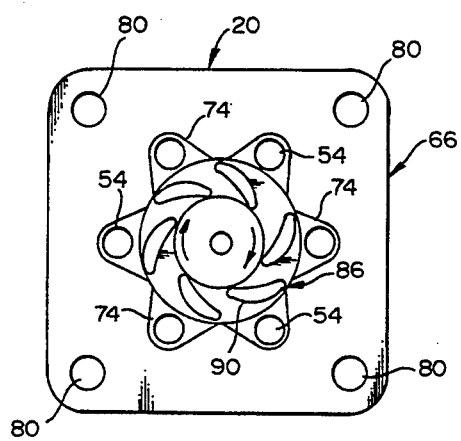
Figure 5:
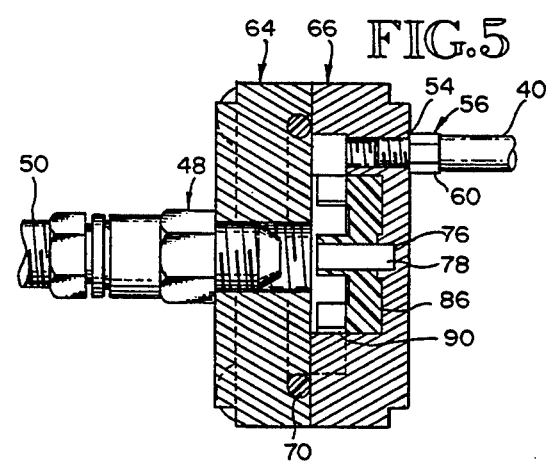
Figure 6:
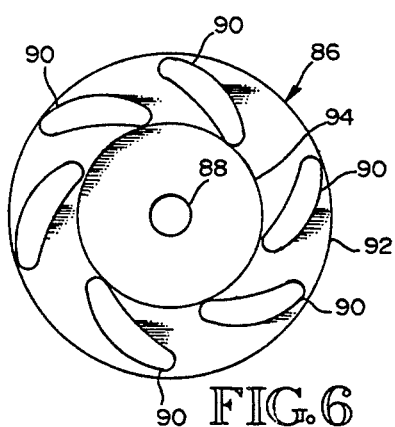
Figure 7:
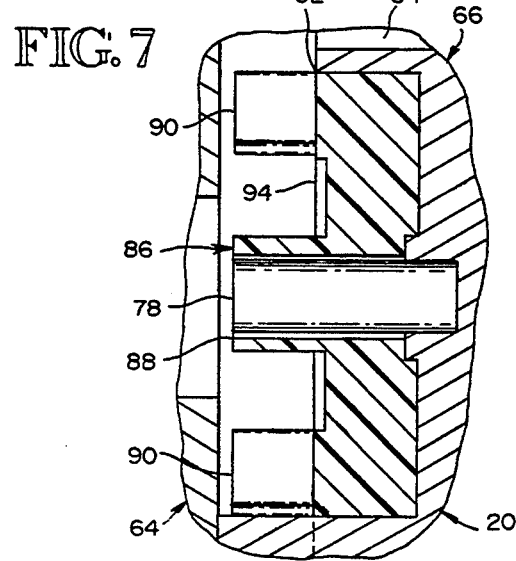
Figure 8:
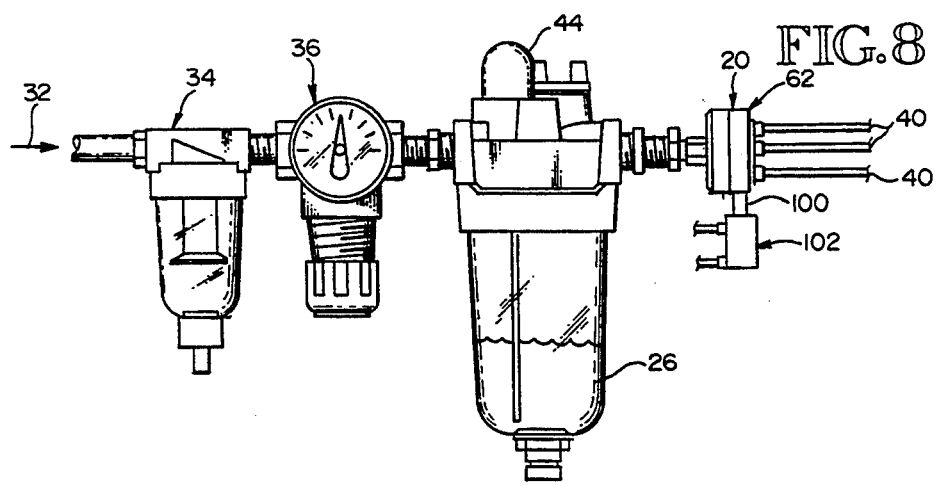
Figure 9:
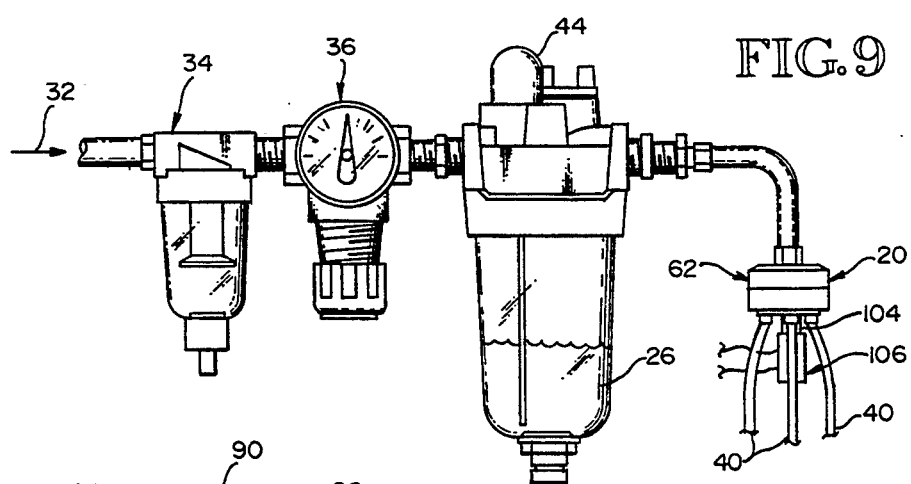
Figure 10:
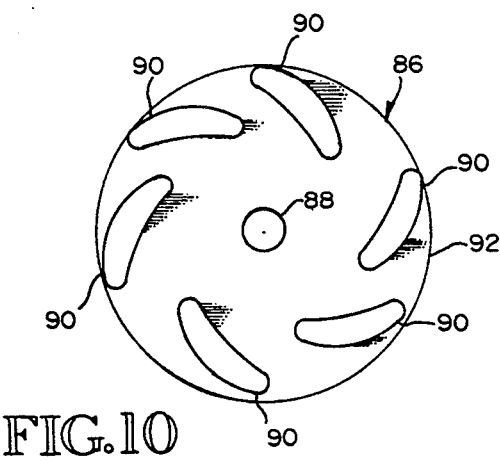
Figure 11:
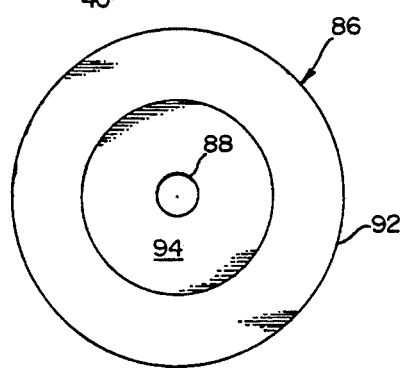
Figure 12:
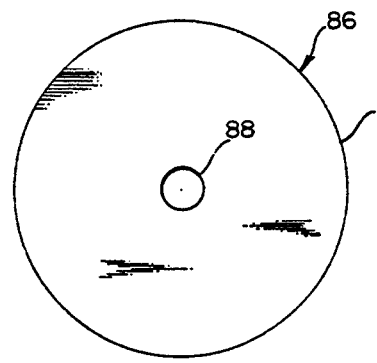

How the incoming or input combined flow 22 is split and distributed is particularly observed in FIGS. 3 through 5. The housing 62 of the flow divider 20 is preferably made in two parts, referred to as parts, halves, half sections or portions, such as input portion 64, and output portion 66. The input portion 64 having an interior recess 68 to receive a seal 70, preferably being a circular seal 70. The output portion 66 has a centered cavity 72, which in this embodiment has six spaced peripheral oil droplet 24 receiving chambers 74, each having a threaded output passageway 54.

Also this output portion 66, has a shaft receiving hole 76 to receive the shaft 78. In addition, this output portion 66, has four corner spaced threaded receiving holes 80, to receive respective headed threaded bolts 82. These bolts 82 first are passed through fastener receiving holes 84 in aligned four corner spaced locations of the input portion 64.

As particularly shown in FIGS. 3, 4, and 5, a disc rotor 86 having a center hole 88, six fluid turbine blades 90, and a circumferential rim 92, forming a peripheral raised structure 92 to aid in creating a disk like configuration 94, is rotatably mounted on the shaft 78. Following the assembly of all these components and their securement by tightening the headed threaded bolts 82, their arrangement as a flow divider 20, is illustrated in FIG. 5.

When lubricating operations are underway, as schematically indicated in FIG. 2, an incoming or input combined flow 22 of droplets 24 of lubricant 26, and air 28 under pressure is entering the passageway 42, or as shown in FIGS. 3 and 4, is entering through the first combined unit 48. This input combined flow 22, upon leaving the first disbursement unit 52, which has a nozzle configuration 96, is directed to the center of the disc rotor 86, for distribution into the dish like configuration 94, thereof.

A portion of this flow energy, in respect to the air 28 portions of this input combined flow 22 encounters the fluid turbine blades 90, causing them 90 and consequently the disc rotor 86 to rotate. The centrifugal forces created cause the droplets 24 of lubricant 26 to collect by the rim 92, and eventually flow over the rim 92.

The flow of droplets 24 of lubricant 26 and air 28 under pressure then becomes six leaving or output combined flows 38, flowing respectively into the six receiving chambers 74, and then through threaded output passageways 54, and the second combinations 56 of a threaded attachment unit 58 and a disbursement unit 60, and beyond through passageways 40, to locales where lubrication is underway.

The number and size of the fluid turbine blades, during the design of an embodiment, is arranged to obtain the desired rotating speed of the disc rotor 86. For example, if the respective vane heights are reduced, the combined flow 22 causes the disc rotor 86 to rotate faster.

This embodiment of the flow divider 20 illustrated in FIGS. 1 through 7, serves to excellently receive, split, and distribute an incoming or input combined flow 22 of droplets 24 of lubricant 26, with air 28 under pressure, into six leaving or output combined flows 38, while all the flows remain continuous to deliver the droplets 24 of lubricant 26, to the respective six locales where lubrication is underway.

Other Embodiments Have Motors to Drive the Disc Rotor

As shown in FIG. 8, the flow splitter or flow divider 20, is equipped with a power input shaft 100, which through a gear assembly, not shown, turns the shaft 78 on which the disc rotor 86 is mounted. When a disc rotor 86, via a power input shaft 100, is turned upon operation of a motor 102, such as a pneumatic or hydraulic motor 102, then fluid turbine blades 90 are not needed during splitting operations. Therefore in some flow dividers, so powered, there are no fluid turbine blades 90.

In FIG. 9, a different positioning of the flow divider 20 is illustrated. Also a power input shaft 104 is aligned with the shaft 78 of the disc rotor 86, being either connected to it, or originally being a part of it. By way of example, this motor 106, is an electric motor 106.

Different Configurations of the Disc Rotor

The disc rotor 86, illustrated in FIG. 10, has fluid turbine blades 90. However, this rotor configuration does not have an active surface structure, which rises in approaching the periphery thereof.

The disc rotor 86, shown in FIG. 11, has no fluid turbine blades 90. However, this rotor configuration does have an active surface structure, which rises in approaching the periphery thereof.

The disc rotor 86, illustrated in FIG. 12, has no fluid turbine blades 20, and has no active surface structure, which rises in approaching the periphery thereof.

The selection of which configuration of a disc rotor 86 to use depends on the components of the incoming or input combined flow. Some of these various components were named previously.

Overall Sizes of the Flow Divider

The illustrated embodiment of the flow divider 20, or splitter 20, in FIGS. 1 through 7, is considered a small size. It is 1.7 square inches of maximum surface area in reference to each of the larger surface areas. The depth or thickness is one inch. However, especially when handling other types of incoming or input flows, the flow divider, or splitter, may exceed twenty square inches and a depth or thickness of ten inches.

We claim:

1. A flow divider to receive and then to split and to distribute a substance, consisting of multiple small units, being moved via flowing gas under pressure for entry into respective passageways, of a group of at least two passageways, each passageway being arranged to be able to direct the substance, consisting of multiple small units, being moved in the flow of gas, into respective extended passageways, extending to respective locales of utilization, comprising:

a. a housing having an input portion and an output portion,
 with the input portion having a central input port extending from the exterior into the interior thereof, and an interior recess to receive a seal,
 with the output portion having a centered cavity to receive a centered shaft and a disc rotor, having a centered hole to be rotatably placed on a centered shaft, and having at least two output ports extending form the centered cavity to the exterior of the housing;

b. said seal for placement in the interior recess of the input portion of the housing;

c. said centered shaft located in the centered cavity of the output portion and secured to the output portion;

d. said disc rotor, having a centered hole, rotatably placed on the centered shaft and rotatable within the centered cavity of the output portion; and e. means to rotate the disc rotor;
 whereby, when a substance consisting of multiple small units, being moved via flowing gas under pressure, through the central input port, is directed to the center of the disc rotor, which is then being rotated, the substance consisting of multiple small units, will be uniformly guided centrifugally on the disc rotor to depart form the disc rotor in equal distributions, and thereafter, the at least two outlet ports of the output portion of the housing, will each receive equal amounts of the substance consisting of multiple small units and the flowing gas.

2. A flow divider, as claimed in claim 1, wherein the means to rotate the disc rotor is a motor.

3. A flow divider, as claimed in claim 2, wherein the motor is an electric motor.

4. A flow divider, as claimed in claim 2, wherein the motor is a hydraulic motor.

5. A flow divider, as claimed in claim 2, wherein the motor is a pneumatic motor.

6. A flow divider, as claimed in claim 1, wherein the means to rotate the disc rotor comprises fluid turbine blades spaced about the circumference of the disc rotor to transform some of the energy of the flowing gas into the rotating energy of the disc rotor.

7. A flow divider, as claimed in claim 1, wherein the disc rotor has an active surface structure receiving the flow, which rises in approaching the periphery thereof, whereby some collecting occurs of the substance, consisting of multiple small units, thereby providing for a more consistent and uniform departure of the substance from the disc rotor.

8. A flow divider to receive and then to split and to distribute a liquid, in a flow of droplets, being moved via flowing gas under pressure, for entry into respective passageways, of a group of at least two passageways, each passageway arranged to be able to direct a flow of droplets in the flow of gas into respective extended passageways, extending to respective locales of utilization, where the liquid in the flow of droplets in directly used for a specific purpose, comprising:

a. a housing consisting of two sections, an input section and an output section, with each of these sections having fastener receiving portions,
   with the input section having a central input port, extending from the exterior into the interior thereof, and an interior circular recess to receive a sealing ring,
   with the output section having: a centered cavity to receive a centered shaft and a disc rotor, having a centered hole, to be rotatably placed on a centered shaft; and having at least two outlet ports, extending from the centered cavity to the exterior of the housing;
b. said sealing ring for placement in the interior circular recess of the input section of the housing;
c. said centered shaft located in the centered cavity of the output section and secured to the output section;
d. said disc rotor, having a centered hole, rotatably placed on the centered shaft, and rotatable within the centered cavity of the output section;
e. fastener assemblies used in conjunction with the fastener receiving portions of the housing to hold the input and output sections together; and
f. means to rotate the disc rotor, whereby when a flow of droplets being moved, via flowing gas under pressure, through the central input port, is directed to the center of the disc rotor, which is then being rotated, the flow of droplets will be uniformly guided centrifugally on the disc rotor to depart from the disc rotor in equal distribution flows of droplets, and thereafter the at least two, outlet ports of the output section of the housing, will each receive equal flows of the droplets and the flowing gas.

9. A flow divider as claimed in claim 8, wherein the means to rotate the disc rotor is a motor.

10. A flow divider as claimed in claim 9, wherein the motor is an electric motor.

11. A flow divider, as claimed in claim 9, wherein the motor is a hydraulic motor.

12. A flow divider as claimed in claim 9, wherein the motor is a pneumatic motor.

13. A flow divider as claimed in claim 8, wherein the means to rotate the disc rotor comprises fluid turbine blades spaced about the circumference of the disc rotor to transform some of the energy of the flowing gas into rotating energy of the disc rotor.

14. A flow divider, as claimed in claim 8, wherein the disc rotor has an active surface structure receiving the flow, which rises in approaching the periphery thereof, whereby some collecting occurs of the flow of droplets, thereby providing for a more consistent and uniform departure of the droplets from the disc rotor.

15. A flow divider to receive and then to split and to distribute machining lubricants arriving in a passageway, wherein the lubricants are being uniformly moved via flowing air under pressure, as droplets and then this arriving flow of droplets of machining lubricants and of pressurized air is evenly split for flowing into multiple passageways, and thereafter distributed equally to multiple locations, where machining operations are being undertaken, comprising:

a. a housing consisting of two halves, an input half and an output half, with each of these two halves having well spaced holes aligned to receive fastening units,
   with the input half having a circular interior recess to receive a sealing ring, and having a central threaded hole serving as an input port to threadably receive a first combined threaded attachment unit and disbursement unit with each of these units having aligned center passageways,
   with the output half having a centered cavity to receive a centered shaft, a rotor, having a centered hole, rotatably placed on the centered shaft, having a receiving cup and peripheral spaced fluid turbine blades, and having multiple equally spaced threaded outlet ports extending from the centered cavity to the exterior of the housing to each receive a like threaded second combined attachment unit and disbursement unit having a centered passageway;
b. said sealing ring for placement in the circular recess of the input half of the housing;
c. said first combined threaded attachment unit and disbursement unit, with each of these units having aligned center passageways, threaded into the central threaded hole serving as an input port of the input half;
d. said centered shaft located in the centered cavity of the output half;
e. said rotor, having a centered hole, rotatably placed on the centered shaft having a receiving cup and peripheral spaced fluid turbine blades;
f. said like multiple threaded second combined attachment and disbursement units each having a centered passageway, threaded respectively into the respective multiple equally spaced threaded outlet ports extending from the centered cavity to the exterior of the housing; and
g. said fastening units for respective placement through the well spaced and aligned holes of the two halves of the housing, and their subsequent tightening, thereby completing assembly o this flow divider.

16. The flow divider, as claimed in claim 15, wherein the receiving cup of the rotor has a depth sufficient to accumulate and to maintain depth of machining lubricant, which in turn departs in equal volumes of flow between the peripheral spaced fluid turbine blades, and on into the respective multiple equally spaced threaded outlet ports, and through the respective multiple threaded second combined attachment and disbursement units, via the respective centered passageways.

17. The flow divider, as claimed in claim 15, wherein the first combined threaded attachment unit and disbursement unit, is sized and positioned to direct the disbursing machining lubricant to the center of the rotor, for the centrifugal distribution and collection thereof in the receiving cup of the rotor, before the machining lubricant departs in equal volumes of flow between the peripheral spaced fluid turbine blades, and on into the respective multiple equally spaced threaded outlet ports, and through the respect ire multiple threaded second combined attachment and disbursement units, via the respective centered passageways.

18. The flow divider, as claimed in claim 15, wherein the first combined threaded attachment unit and disbursement unit, is sized and positioned to direct the disbursing machining lubricant to the center and nearby the center of the rotor for the collection thereof in the receiving cup of the rotor.

19. The flow divider, as claimed in claim 15, wherein the flowing air under pressure is strong enough to cause the peripheral spaced fluid turbine blades of the rotor to rotate at a sufficiently high rate of speed, so centrifugal forces are effective in causing the machining lubricant to depart in equal volumes of flow between the peripheral spaced fluid turbine blades, and on into the respective multiple equally spaced threaded outlet ports, and through the respective multiple threaded second combined attachment and disbursement units, via the respective centered passageways, while remaining in equal volumes.

20. The flow divider, as claimed in claim 15, wherein the flowing air under pressure is not strong enough on occasions to cause the fluid turbine blades of the rotor to rotate at a sufficiently high rate of speed, comprises, in addition:
   a motor to rotate the rotor at a sufficiently high rate of speed so centrifugal forces are effective in causing the machining lubricant to depart in equal volumes of flow between the peripheral spaced fluid turbine blades, and on into the respective multiple equally spaced threaded outlet ports, and through the respective multiple threaded second combined attachment and disbursement units, via the respective centered passageways.

21. The flow divider, as claimed in claim 18, wherein the flowing air under pressure is strong enough to cause the fluid turbine blades of the rotor to rotate at a sufficiently high rate of speed, so centrifugal forces are effective in causing the machining lubricant to depart in equal volumes of flow between the peripheral spaced flu id turbine blades, and on into the respective multiple equally spaced threaded outlet ports, and through the respective multiple threaded second combined attachment and disbursement units, via the respective centered passageways.

22. The flow divider, as claimed in claim 18, wherein the flowing air under pressure is not strong enough to cause the fluid turbine blades of the rotor to rotate at a sufficiently high rate of speed, comprises, in addition:
   a motor to rotate the rotor at a sufficiently high rate of speed so centrifugal forces are effective in causing the machining lubricant to depart in equal volumes of flow between the peripheral spaced fluid turbine blades, and on into the respective multiple equally spaced threaded outlet ports, and through the respective multiple threaded second combined attachment and disbursement units, via the respective centered passageways.

23. A flow divider to receive and then to split and to distribute machining lubricants arriving in a passageway, wherein the lubricants are being uniformly moved via flowing air under pressure, yet the machining lubricants are not being atomized, instead remaining in droplets, and then this arriving flow of machining lubricants and of pressurized air is evenly split for flowing into multiple passageways, to be thereafter distributed equally to multiple locations, where machining operations are being undertaken comprising:
   a. housing having: a central portion, in turn having a cavity; a centrally located input port passageway to receive and to direct the arriving flow of machining lubricants and of pressurized air to the cavity of the central portion of this housing; a shaft receiving means centered in this cavity, whereby a shaft will in turn receive a rotor; and spaced multiple output port passageways to receive, to direct, and to distribute, equal flows of the combined machining lubricants and pressurized air leaving the cavity;
   b. said shaft centered in the cavity and mounted on the shaft receiving means; and
   c. said rotor mounted on the shaft having peripheral spaced fluid turbine blades, spaced sufficiently to allow the passage of the flow of the combined machining lubricants and pressurized air, into the respective spaced multiple output port passageways.

24. A flow divider, as claimed in claim 23, wherein the rotor has a receiving cup.

25. A flow divider, as claimed in claim 24, wherein the receiving cup of the rotor has a depth sufficient to accumulate and to maintain a depth of machining lubricant, which in turn departs in equal volumes of flow between the peripheral spaced fluid turbine blades, and on into the spaced multiple output port passageways to receive and to direct equal flows of the combined machining lubricants and pressurized air leaving the cavity.

26. A flow divider, as claimed in claim 25, wherein the number of peripheral spaced fluid turbine blades are equal to the number of spaced multiple output port passageways.

27. A flow divider, as claimed in claim 26, wherein the flowing air under pressure is strong enough to cause the fluid turbine blades of the rotor to be rotated at a sufficiently high rate of speed, so centrifugal forces are effective in causing the machining lubricant to depart in equal volumes of flow between the peripheral spaced fluid turbine blades, and on into the respective spaced multiple output poet passageways.

28. A flow divider, as claimed in claim 26, wherein the flowing air under pressure is not always strong enough to cause the fluid turbine blades of the rotor to be rotated at a sufficiently high rate of speed, comprising, in addition:
   a motor to rotate the rotor at a sufficiently high rate of speed so centrifugal forces are effective in causing the machining lubricant to depart in equal volumes of flow between the peripheral spaced fluid turbine blades, and on into the respective spaced multiple output port passageways.

* * * * *